US011494081B2

(12) United States Patent
Wu (10) Patent No.: US 11,494,081 B2
(45) Date of Patent: Nov. 8, 2022

(54) SYSTEM AND METHOD FOR USING TELEMETRY DATA TO CHANGE OPERATION OF STORAGE MIDDLEWARE CLIENT OF A DATA CENTER (71) Applicant: Seagate Technology LLC, Fremont, CA (US)

(72) Inventor: Sining Wu, Chichester (GB)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 17/066,566

(22) Filed: Oct. 9, 2020

(65) Prior Publication Data

US 2022/0113876 A1    Apr. 14, 2022

(51) Int. Cl.
G06F 3/06        (2006.01)
G06F 11/34       (2006.01)
H04L 67/1097     (2022.01)
H04L 67/568      (2022.01)

(52) U.S. Cl.
CPC .......... *G06F 3/0611* (2013.01); *G06F 3/0635* (2013.01); *G06F 3/0683* (2013.01); *G06F 11/3433* (2013.01); *H04L 67/1097* (2013.01); *H04L 67/568* (2022.05)

(58) Field of Classification Search
CPC ................................................... G06F 3/0611
USPC ......................................................... 711/114
See application file for complete search history.

(56) References Cited

U.S. PATENT DOCUMENTS

| 7,454,491 | B2* | 11/2008 | Blackmore | H04L 67/10 370/282 |
|---|---|---|---|---|
| 8,849,793 | B2* | 9/2014 | Vexler | G06F 16/24552 707/716 |
| 9,064,213 | B2 | 6/2015 | Deng et al. | |
| 9,411,645 | B1* | 8/2016 | Duan | G06F 9/4887 |
| 9,565,129 | B2 | 2/2017 | Bai et al. | |
| 9,769,050 | B2 | 9/2017 | Herdrich et al. | |
| 2006/0041776 | A1* | 2/2006 | Agrawal | G06F 9/541 714/2 |
| 2006/0107087 | A1* | 5/2006 | Sieroka | G06F 9/45558 714/4.1 |
| 2008/0021996 | A1* | 1/2008 | Chambliss | G06F 11/3414 709/224 |
| 2008/0288957 | A1* | 11/2008 | Cascaval | G06F 9/5038 719/313 |

(Continued)

OTHER PUBLICATIONS

Adams et al., "Usage Behavior of a Large-Scale Scientific Archive", Proceedings of the 2012 International Conference for High Performance Computing, Networking, Storage and Analysis, Nov. 2012, 11 pages.

*Primary Examiner* — Titus Wong
(74) *Attorney, Agent, or Firm* — Mueting Raasch Group (57) ABSTRACT During operation of a data center, telemetry data is gathered that is indicative of performance of a storage system. The data center includes a middleware client that abstracts and optimizes storage commands for an application operating in the data center. Via the middleware client, a change in the application's use of the storage system is determined. Responsive to the change in the application, a change in the storage system is determined that will result in an improvement in storage performance for the application. The change to the storage system is applied via the middleware client to affect subsequent access of the storage system by the application.

20 Claims, 7 Drawing Sheets

(56) References Cited

U.S. PATENT DOCUMENTS

| | | | |
|---|---|---|---|
| 2010/0218190 A1* | 8/2010 | Das | G06F 16/00 718/102 |
| 2011/0041132 A1* | 2/2011 | Andrade | G06F 9/5083 718/102 |
| 2011/0047172 A1* | 2/2011 | Chen | G06F 16/24532 707/764 |
| 2011/0066894 A1* | 3/2011 | Berlyant | G06F 9/5066 714/38.1 |
| 2012/0011255 A1* | 1/2012 | Kusama | H04L 67/1002 709/226 |
| 2012/0239730 A1* | 9/2012 | Revanuru | G06F 16/20 709/223 |
| 2012/0297145 A1* | 11/2012 | Castillo | G06F 11/3466 711/138 |
| 2013/0086355 A1* | 4/2013 | Narang | G06F 9/5066 712/30 |
| 2013/0318525 A1* | 11/2013 | Palanisamy | G06F 9/5066 718/1 |
| 2013/0332612 A1* | 12/2013 | Cai | H04L 47/70 709/226 |
| 2014/0031956 A1* | 1/2014 | Slessman | H05K 7/1498 700/28 |
| 2014/0108646 A1* | 4/2014 | Cheung | H04L 43/04 709/224 |
| 2014/0222745 A1* | 8/2014 | Deng | G06Q 10/00 706/47 |
| 2015/0227392 A1* | 8/2015 | Fuller | G06F 9/4881 718/104 |
| 2016/0261523 A1 | 9/2016 | Razack et al. | |
| 2017/0054796 A1* | 2/2017 | Eda | H04L 67/1002 |

\* cited by examiner

SYSTEM AND METHOD FOR USING TELEMETRY DATA TO CHANGE OPERATION OF STORAGE MIDDLEWARE CLIENT OF A DATA CENTER

SUMMARY

The present disclosure is directed to a system and method for using telemetry data to change operation of a storage middleware client of data center. In one embodiment, a method involves, during operation of a data center, gathering telemetry data that is indicative of performance of a storage system. The data center includes a middleware client that optimizes and abstracts storage commands for an application operating in the data center. Via the middleware client, a change in the application's use of the storage system is determined. Responsive to the change in the application and based on the telemetry, a change in the storage system is determined that will result in an improvement in storage performance for the application. The change to the storage system is applied via the middleware client to affect subsequent access of the storage system by the application.

In another embodiment, a system (e.g., a data center) includes a plurality of computing nodes and a user application running on at least one of the computing nodes. The system includes a storage system that stores data for the plurality of computing nodes. A middleware client runs on a server of the data center. The middleware component couples the user application to the storage system, and further abstracts and optimizes storage commands for the user application. The middleware component is further configured to, during operation of the data center, gather telemetry data that is indicative of performance of the storage system. The middleware component determines a change in the user application's use of the storage system and, responsive to the change in the user application, determines a change in the storage system that will result in an improvement in storage performance for the user application. The change is applied to the storage system to affect subsequent access of the storage system by the user application.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to distributed storage systems used in a data center or other large-scale computing facilities. Large data centers may include tens of thousands of servers, and each server may host multiple virtual machines. In such a large system, the mass data storage is typically implemented using dedicated storage nodes. In the dedicated storage nodes, racks of storage devices (e.g., hard disk drives, solid state drives) are co-located and centrally managed. The mass data storage may be presented as a service to the computing nodes via an input/output (IO) middleware component, all of which are coupled to high speed networks to move data in and out of storage.

Generally, an IO middleware component as described herein is a software component, e.g., operating as a network service, process, daemon, etc., that abstracts IO calls (e.g., as block device access calls) that are then analyzed in order to optimize the flow of data between the mass data storage device and user applications. This optimization can increase throughput, reduce latency, reduce contention for shared resources, etc. For example, in clustered computing, a large number of processes may be accessing common data structures, e.g., the same files/blocks, when performing a centrally-coordinated clustered computing task that is distributed to the processes. An IO middleware component can more efficiently manage these accesses, e.g., via local buffering of certain data, than a traditional filesystem would be able to.

Guided IO is often used in IO middleware, providing applications, workflow and schedulers with the abilities to express explicit data usage to the storage system. Guided IO enables information exchange in the form of hints about IO and data usage patterns between the applications and the IO middleware. This information exchange allows the storage system to co-ordinate data movements in the IO stack well in time for actual data access. Hints that are in use in IO middleware today are simplistic and typically deal only with predicted data access patterns in applications (and workflow/scheduler).

Figure 1:
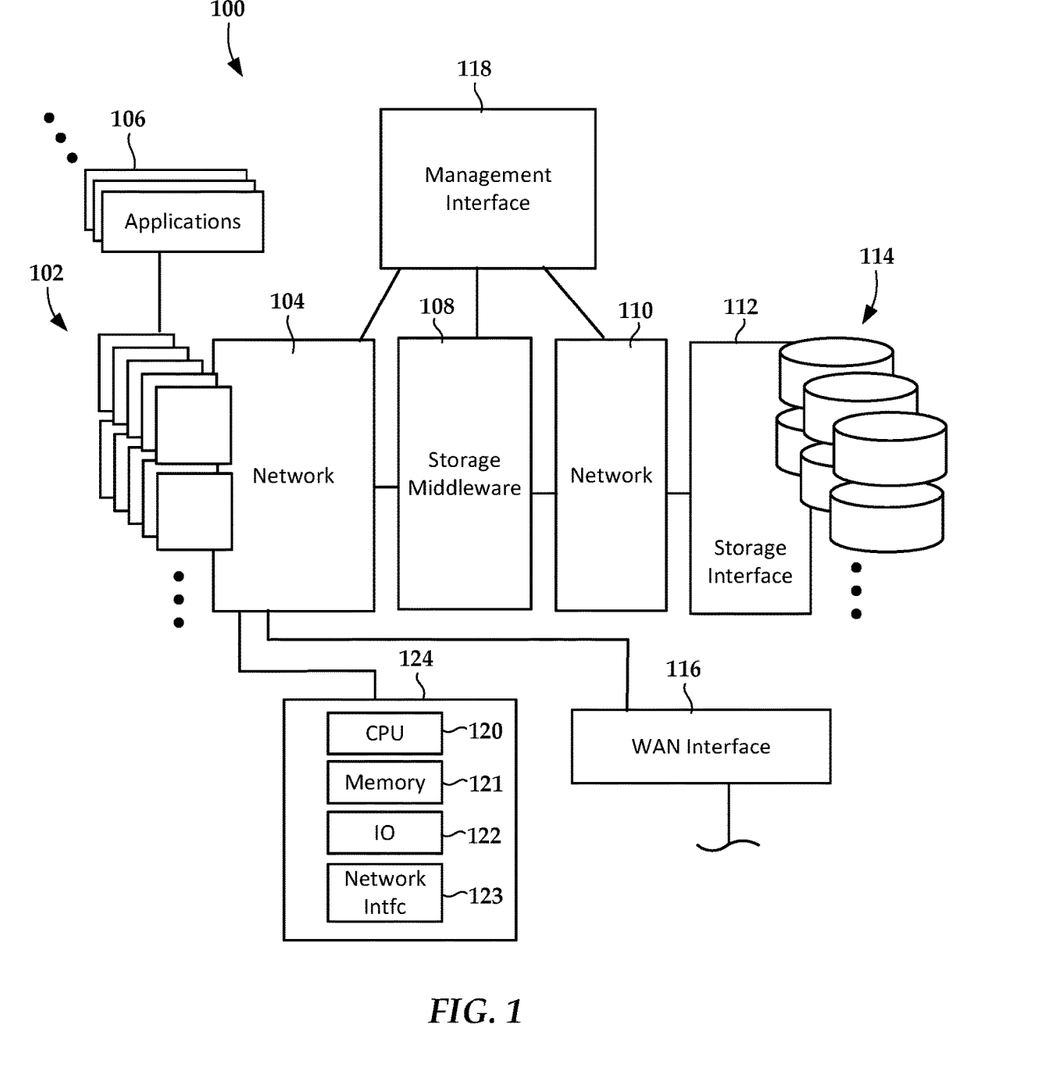
FIG. 1 is a block diagram of a data center system according to an example embodiment.

In FIG. 1, a diagram illustrates a data center 100 according to an example embodiment. The data center 100 includes a plurality of computing nodes 102, which each generally includes computing hardware such as central processing units (CPUs), random access memory (RAM), graphics processing units (GPU), IO hardware, etc. The computing nodes 102 are generally coupled to one or more network segments 104 that allow the compute nodes 102 to communicate with one another and with the rest of the data center 100.

The computing nodes 102 may include individual servers, or each may include a virtual machine, where multiple virtual machines run on a single host server. The computing nodes 102 may each include independently-operating software, e.g., kernels, operating systems, drivers, etc. Generally, the arrangement and configuration of the nodes 102 may be different depending on the high-level functions of the data center 100, here represented as applications 106. For example, the data center 100 may be configured as a general-purposes web service provider, offering such services as Web hosting, email hosting, e-commerce, relational database, etc. In other embodiments, the data center 100 may provide a single service such as cloud storage, cloud compute, machine learning compute, paralleled supercomputing, etc.

The applications 106 are also referred to herein as user applications, in that an end-user relies on the applications 106 to perform specified tasks. While some user applications will involve user direct user interactions (e.g., web server, e-commerce) not all user applications will require direct user interface. Even so, a user may ultimately desire that the application perform to some minimum level of service. For example, if the user application performing a compute intensive task such as training a neural network, the user will generally have some expectation that the data center perform adequately (e.g., as measured by time to completion) compared to another computing option, e.g., a high end dedicated workstation. Note that the term user application is not meant to imply only a single user process. For example, a user application may include cluster computing application, in which many thousands of individual processes work across the data center on a single task.

Generally, the applications 106 will use some level of persistent data storage. This storage is accessed via a storage middleware 108 that is coupled to the computing nodes 102. The storage middleware 108 (also referred to herein as a "middleware client") communicates with a network 110 that is dedicated to storage, e.g., a storage area network (SAN). The storage middleware 108 can run on any combination of nodes on the system, and may operate on dedicated servers, e.g., a subset of the computing nodes 102 that provide distributed services across the data center 100. The storage network 110 is coupled to local storage interfaces 112 (e.g., controller cards) that ultimately send data in and out of storage media 114, e.g., hard disks, solid-state drives (SSDs), optical storage, tape storage, etc.

Also shown in the data center 100 is a wide-area network (WAN) interface 116 that provides external access to the data center 100, e.g., via the public Internet, and/or via non-public WANs. A management interface 118 is shown coupled to various components within the data center 100. The management interface 118 may include software that runs dedicated hardware (e.g., management computers) as well as being distributed to other computing nodes and devices throughout the data center 100. The management interface 118 may provide, among other things, interfaces that allow a person or a supervisor program manage aspects of data center operations such as load balancing, thermal management, failure detection and remediation, etc.

The hardware used in the data center 100 can vary widely, but generally includes conventional computing components as illustrated by example computing device 124. The device 124 includes a processor 120 (e.g., central processing unit, or CPU) that runs software instructions, and may also include embedded firmware. A memory 121 is coupled to the CPU 120, and may include any combination of volatile memory (e.g., random access memory, or RAM) and non-volatile memory (e.g., flash memory, magnetic storage). The CPU 120 communicates with the memory 121 and other peripherals via IO circuitry 122, which may include memory busses, peripheral busses, etc. An example of a peripheral device is shown as network interface 123, which facilitates communicating via the networks 104.

The present disclosure includes features used by the storage middleware 108 to improve storage performance. For example, one type of storage middleware used in parallel computing is the message passing interface input-output (MPI)-IO, which is a persistent storage interface designed to perform certain parallel computing tasks more efficiently than legacy filesystem interfaces. For example, MPI-IO makes it possible to read and write a single file from a large number of processes, providing each process with well-defined locations from which the data can be accessed.

A feature known as MPI-IO hints enable MPI applications to select IO preferences and parameters on data access layouts, collective IO optimizations and file system specific configurations. However, these hints are generally coarse-grained and only portray a static view on how an application uses IO. Using MPI-IO hints to set storage parameters may fit well with the applications which have well-established workflow and IO access patterns. But MPI-IO hints does not perform as well when an application shows more dynamic workload such as the S3 storage system in a cloud environment or when the applications running on a shared storage system exhibit diverse workload characteristics.

When processing hints, MPI-IO performs optimizations according to a set of pre-defined rules without considering the state of underlying file system, not being able to achieve the best performance. The problem of existing guided IO frameworks is that it considers only the hints from applications and makes optimization decisions without any information about the states of the storage system and application's workload characteristics.

In embodiments described below, a middleware framework gathers telemetry data in real time or near real time to gain insights on application's workload. The framework is able to generate hints used to set storage parameters by analyzing the telemetry/trace data and making optimization decisions based on detailed and up-to-date information of the storage system.

As noted above, existing guided IO frameworks may only consider only relatively static hints from applications. Thus the framework makes optimization decisions without any information about the states of the storage system and application's workload characteristics. In embodiments described below, more dynamic information can be gained from telemetry data (e.g., of the storage system) by making use of system observability. Such dynamic telemetry information can help the guided IO frameworks to maintain optimal performance even in view of changing system requirements.

System observability is a way to help a system to generate, collect telemetry/trace data and gain insights about the application workload and system status. It has attracted more attention recently. Linux kernel community in the past few years continually added features to enhance its observability such as Berkeley Packet Filter (BPF) and its frontends for BPF performance tools, BCC and bpftrace. For HPC applications, at the Los Alamos National Laboratory (LANL), computing clusters are monitored closely to ensure their availability. Terabytes of data are collected every day on each cluster's operation from several sources: job scheduler logs, sensor data, and file system logs, among others. Seagate Motr object store of Cortx project has developed ADDB (Analytic and Diagnostic Data Base) sub-system to collect information about system behavior ("telemetry information"). The ADDB sub-system is designed for the continuous collection of introspective and diagnostic data from Mero subsystems.

Taking advantage of the progress in system observability (of generating performance telemetry data), the following embodiments include a guided IO framework that integrates a telemetry/trace system. In this way, the guided IO framework is able to gain insights on application's workload, generates hints by analyzing the telemetry/trace data and make better optimization decisions based on detailed and up-to-date information of the storage system.

Figure 2:
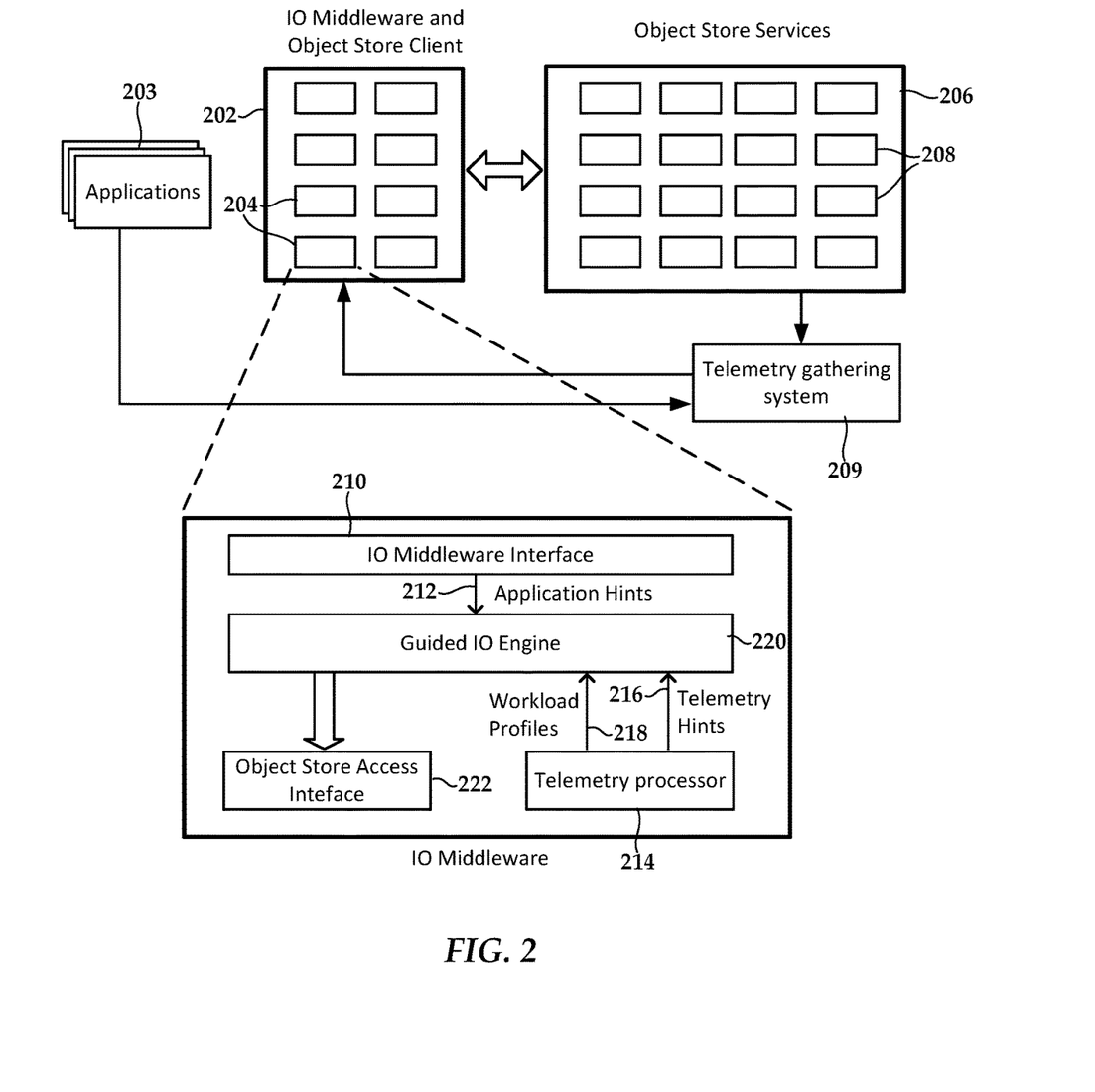
FIG. 2 is a diagram of a guided input-output framework according to an example embodiment.

In FIG. 2, a diagram shows a guided IO framework according to an example embodiment. The framework includes an IO middleware layer 202 (e.g., middleware client) that communicates with a storage layer 206, which in this case includes object store as the backend storage. Note that this guided framework can also be applied to other types of IO middleware with file system backends such as MPI-IO and Lustre.

The IO framework is divided into client nodes 204 and service nodes 208. A built-in or external performance telemetry system 209 is used with the object storage layer 206 to generate, collect and store telemetry data. The telemetry data may be gathered from the object storage layer 206 include, for example, current throughput (TOPS), random/sequential characteristics of data access, request sizes, composition of reads versus writes, arrangement of de-clustered parity in drive arrays, etc. The IO middleware 202 associated with the client nodes which bridges applications 203 and the object store 206. The telemetry system 209 may also gather data from the applications 203 themselves, either directly as shown or via the client nodes 204.

As seen in the close up view, the IO middleware 202 includes a middleware interface 210 that provides applications with APIs to specify hints 212. These hints 212 may be provided, e.g., in a configuration file that is read when the IO middleware is started or restarted. The IO middleware 202 includes telemetry processors 214 that accesses and analyzes telemetry data to generate hints 216 with richer representation, e.g., based on current workloads. This characterization of workloads are shown as workload profiles 218, which can be communicated to a guided IO engine 220 that manages the storage operations between clients and storage backend, e.g., via object store access interface 222.

Figure 3:
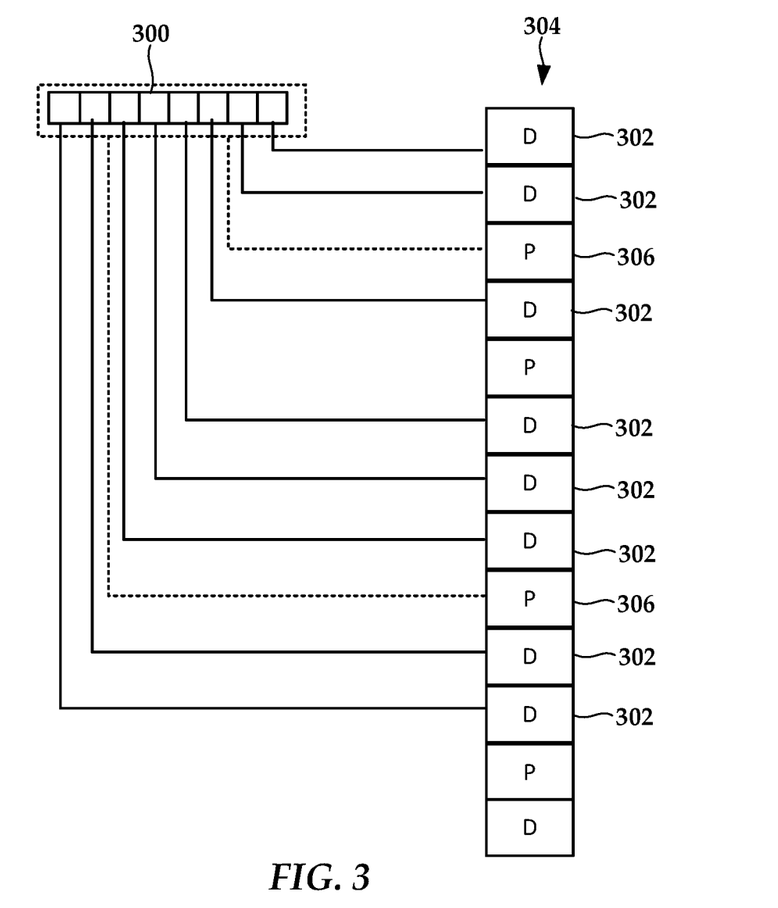
FIGS. 3 and 4 are diagrams illustrating different mappings of data to de-clustered parity according to an example embodiment.
Figure 4:
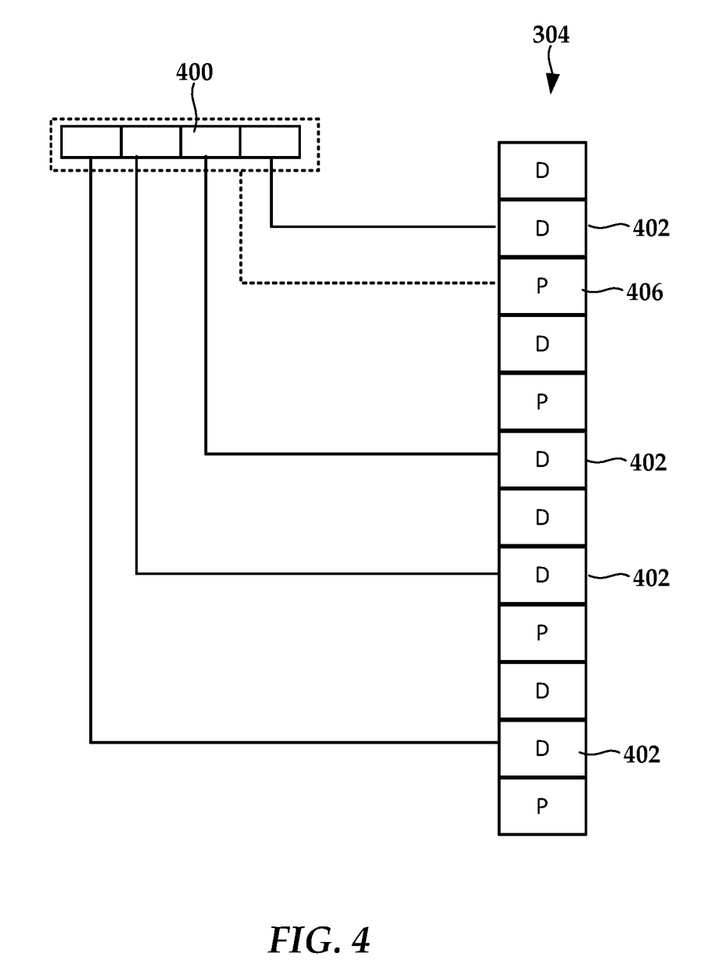

Unlike the application hints 212 which are usually pre-set, the hints 216 from telemetry processor are distilled from continually generated telemetry data and will be constantly updated. An example of telemetry hints is to set the default data unit size of the de-clustered parity data layout according to object IO performance observed in the telemetry data. An example of this is shown in FIGS. 3 and 4. In both of these figures, a storage array 304 uses a de-clustered parity in a redundant array of independent disks (RAID) array. In a de-clustered parity arrangement, the parity segments (referred to herein as "chunks") that make up part of a volume are distributed throughout the physical drives together with the data chunks. This can speed the rebuild time of failed drives in the RAID array.

In FIG. 3, a unit 300 of data stored by a client is divided into eight data sections, which are each mapped and distributed to different data chunks 302 on the storage array 304. For each data unit 300, two different parity values are calculated and stored as parity chunks 306 on the storage array 304. In FIG. 4, a unit 400 of data stored by the same or different client on the same storage array 304 under another configuration is divided into four data sections. Each of the data sections are mapped and distributed to different data chunks 402 on the storage array 304. For each data unit 400, one parity value is calculated and stored as a parity chunk 406 on the storage array 304. The units of data 300, 400 in FIGS. 3 and 4 may be of different sizes or the same size. By changing the mapping of data to the de-clustered parity and data chunks, the storage performance of the applications storing the data 300, 400 can be tailored to currently-detected workload profiles.

In reference again to FIG. 4, the workload profiles 218 are up-to-date data that reflect characteristics of running applications and are fed to the guided IO engine 220. Although the data volume generated by telemetry sub-system is usually tuned to be modest, the amount of data accumulated every day is still large. Unlike a full-fledged telemetry data analysis system, the telemetry processor component 214 can be architected in a way similar to Map-Reduce processing.

A Map-Reduce framework enables spreading most of the heavy-lifted data pre-processing across multiple nodes instead of collecting all raw telemetry data into a shared repository and processing them. This embarrassing parallelism makes fast updates of data possible.

Figure 5:
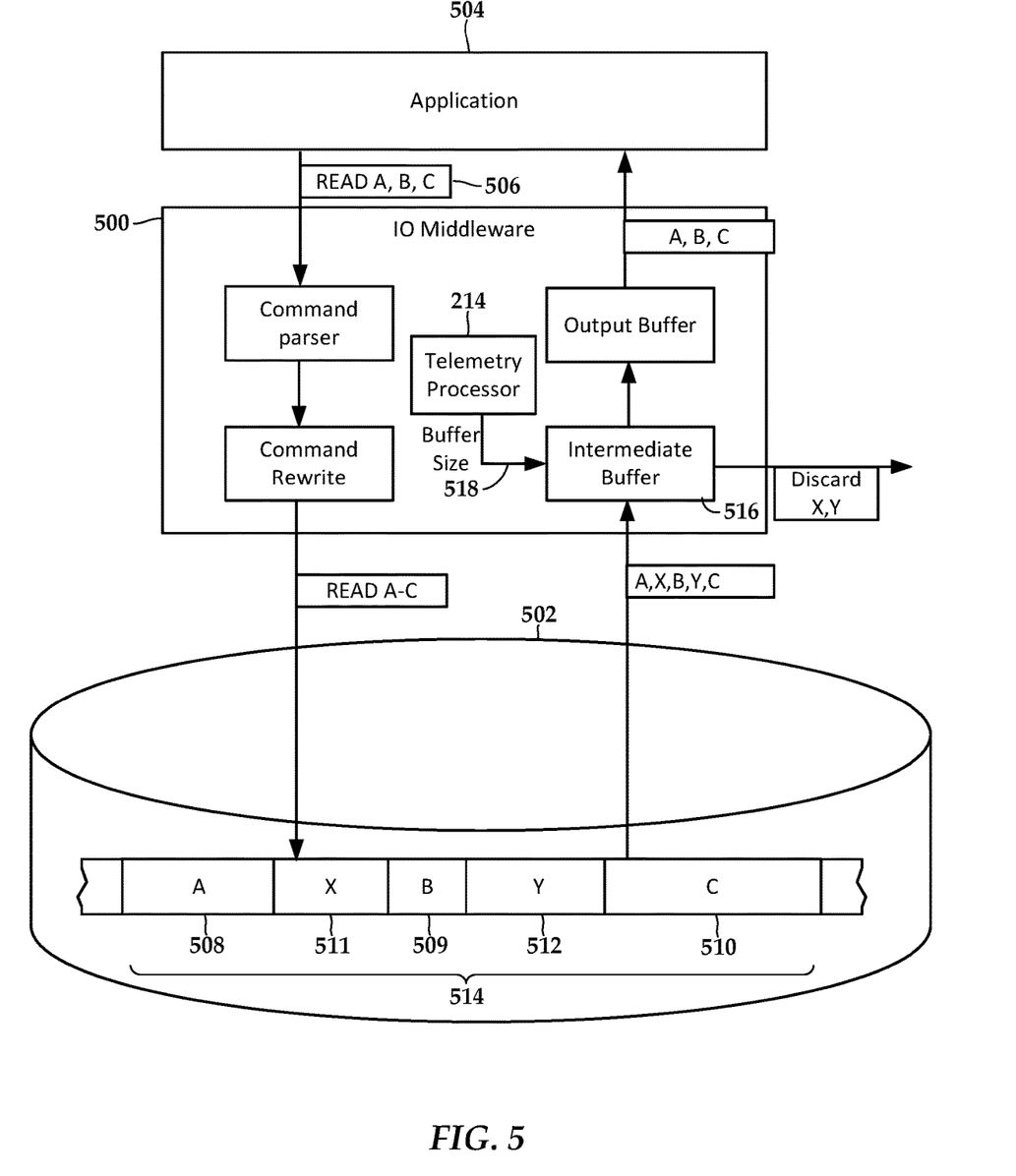
FIG. 5 is a diagram showing data sieving and two stage input-output according to an example embodiment.
Figure 6:
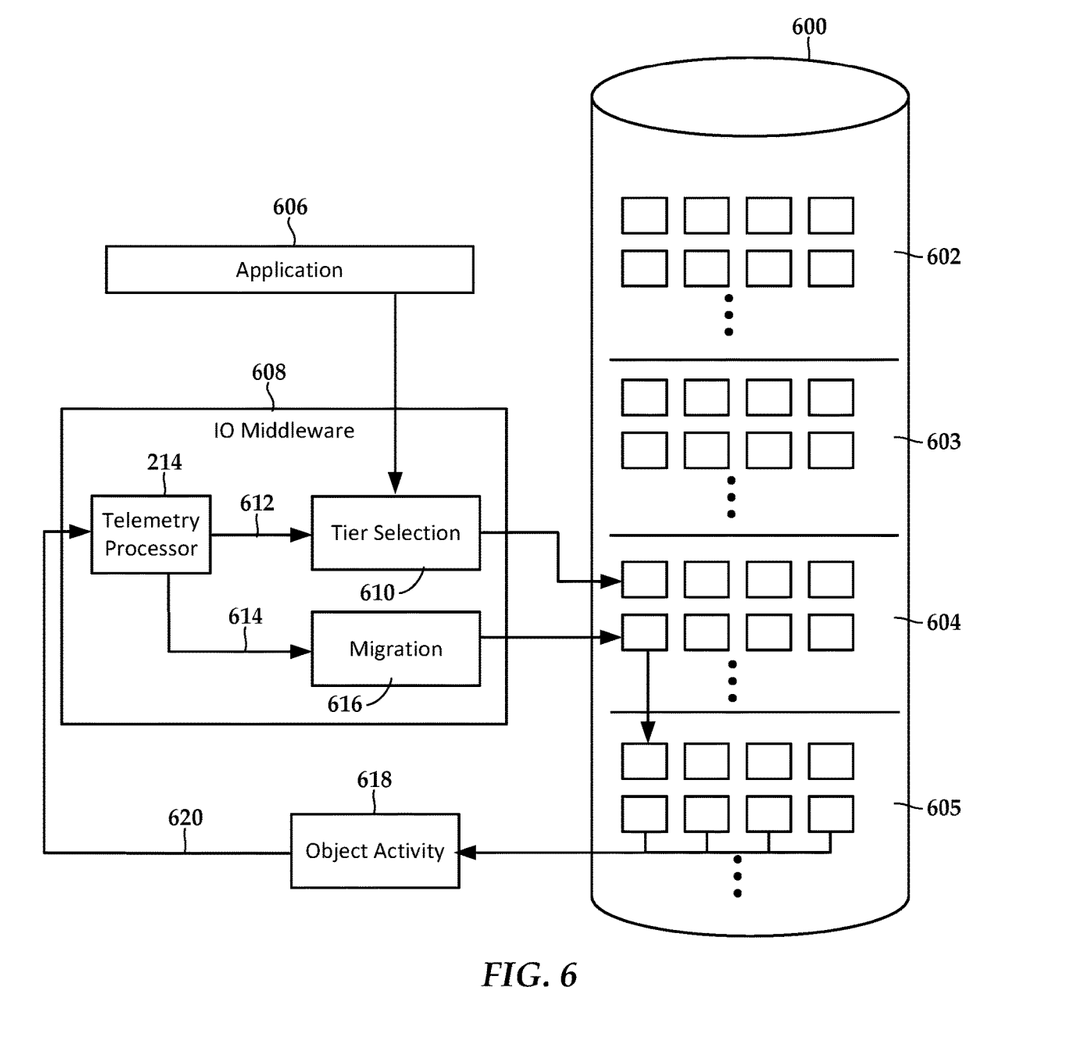
FIG. 6 is a diagram showing a data storage object hierarchy according to an example embodiment.

The guided IO engine 220 receives hints both from applications and internal telemetry components. These hints together with workload profiles 218 empower the guided IO engine 220 to make optimization decisions. In FIGS. 5-6, diagrams show examples of how the hints 216 and workload profiles 218 can be used. In FIG. 5, a diagram shows an example of data sieving and two-phase IO that can be optimized via telemetry in a system according to an example embodiment. As seen in this figure, a middleware component 500 (e.g., middleware client) retrieves data from a data store 502 on behalf on an application 504, as indicated by data request 506. The middleware component 500 can be configured to perform data sieving and two-phase IO in response to this request 506.

Data sieving and two-phase IO are optimization techniques used in high performance computing (HPC) IO middleware such as MPI-IO. Data sieving is a technique for efficiently accessing noncontiguous regions 508-510 of data in objects in response to a read operation. In the data sieving technique, the noncontiguous regions are accessed by reading a block 514 of data containing all of the regions 508-510, including the unwanted data 511, 512 between them (called "holes"). The regions of interest 508-510 are then extracted from this large block by the middleware 500. This technique has the advantage of a single I/O call, although additional data is read from the disk and passed across the network. If the data store performs better for sequential reads (versus random access) and the storage network has sufficient bandwidth and buffer capacity, data sieving can provide superior performance compared to traditional random access reads.

Applications of MPI-IO can specify hints such as the size (in bytes) of the intermediate buffer 516 and then MPI-IO decides if it will perform data sieving optimization based on some pre-defined heuristics. The application-chosen parameters don't always match the storage backends. Using framework, the size 518 of the intermediate buffer will be better inferred from object IO accessing history by telemetry processor based on the telemetry data. The decision on when to trigger data sieving can be calculated based on up-to-date status of storage backend and IO performance profiles.

The IO middleware can also be used to optimize access to object-based storage systems. Generally, object-based storage systems manage data as objects, as opposed to a file hierarchy (e.g., via filesystem interface), and block storage which manages data as blocks within sectors and tracks. The storage objects include data being stored, a unique identifier, and other metadata. This allows easier management of objects within the storage system, as the system may have access to richer information regarding the objects than would be the case for block storage. For example, the representation of data as objects allows establishing performance hierarchies of objects, which can guide the ultimate storage device/array in which the object is stored. Note that while IO middleware can optimize hierarchies for object based storage, these concepts may also apply to other storage hierarchy schemes that do not use object-based storage. For example, a hybrid storage arrangement using different layers of non-volatile storage (e.g., flash memory, hard disk). A storage controller may dynamically classify blocks, files, etc., as being suited for storage in one of the tiers, e.g., making a tradeoff between expensive fast storage and cheaper slow storage to balance performance versus cost.

In FIG. 6, a diagram shows an example of object hierarchy management that can be optimized via telemetry in a system according to an example embodiment. A data store 600 includes different tiers 602-605 of storage that store data objects. The tiers 602-605 could be based on any combination of characteristics of the underlying storage media and the data access characteristics of an application 606 that uses the storage 600. Those characteristics may include data transfer speed, latency, random/sequential, reliability (e.g., amount of redundancy to protect against data loss due to device failure), read/write characteristics (e.g., write-once, read-many), etc. The application 606 may be assigned or select a single tier, or multiple tiers.

A middleware component 608 manages the tiered storage on behalf of the application 606, as well as multiple other applications (not shown). The middleware component 608 may hide or abstract the tiered storage, such that the ultimate tier in which data is stored is decided by a middleware selection component 610. For example, the middleware component may advertise two storage tiers usable by the application 606, even though there are more tiers available (four tiers 602-605) in this example. This allows the middleware component 608 to adjust the tiers used based on telemetry data 612 received from the telemetry processor 214.

In one example of how the middleware component 608 may operate, consider that as the number of data objects stored in the data store 600 grows, sometimes it may be desirable to migrate objects into a different tier. This is indicated by migration component 616, which also receives data 614 from the telemetry processor 214. Choosing which objects to be moved can be difficult. In this example, an object activity indicator 618 provides telemetry data 620 such an index showing how active an object is during a specified period. By using this index data 620, the middleware component 608 can enumerate the top-N least active candidate objects. The definition of the index data 620 takes into account access history of an object, including how the numbers of READ/WRITE change over time and the time of last access, etc. The object activity component 618 also records and summaries access pattern for each individual object such as IO size, type of IO operation and IO throughput etc. These metrics will help picture how object IO evolves over time and answer questions like what is the most often used IO size, how long an object keeps active (or becomes "cold"), how often an object be updated, etc. The time length during which an object is active, along with the top-N active object list, can be used as hints for the migration component 616 to decide when to trigger migration on which objects.

While object activity indicator gives an insight of each individual object, normally an application 606 accesses a set of objects as a whole. By analyzing telemetry data, the middleware is able to understand how a user organizes and manipulates objects. This is useful for optimizations like data migration process. For example, it has been found that in some scenarios most accesses occur from a subset of users and sessions and are often very predictable. Because of these behaviors, there could be significant benefit gained from an asynchronous batch interface that allows a scheduler to intelligently group and place writes while scheduling around more latency sensitive processes. Because end-users are often less tolerant of latency than something like an integrity checking process (e.g., a process that scans data in the background to look for errors), the integrity checking can be given a lower-priority and run in batch mode in the background, improving user quality-of-service for storage operations associated with user interactive processes while still providing for administrative and maintenance tasks that ensure long-term data storage integrity.

Generally, a middleware component can use system telemetry to discover data access patterns and predict workload at different granularities (e.g., applications, groups, data center). For example, workload analysis from telemetry data can reveal what the workload looks like over the course of a week, e.g., if the workload has diurnal patterns linked to the workday. Other characteristics that can be revealed is whether the workload exhibits bursty IO characteristics and what is the peak IO throughput. All these are helpful in system planning, efficient power management. When recording the history of workload over a certain period, it can also be used to analyze how the workload changes over time and predict the future workload level to help decide if system changes are desirable, such as adding more servers and disks. All the information mentioned above can be represented as hints and workload profile and used to optimize application's IO performance.

Figure 7:
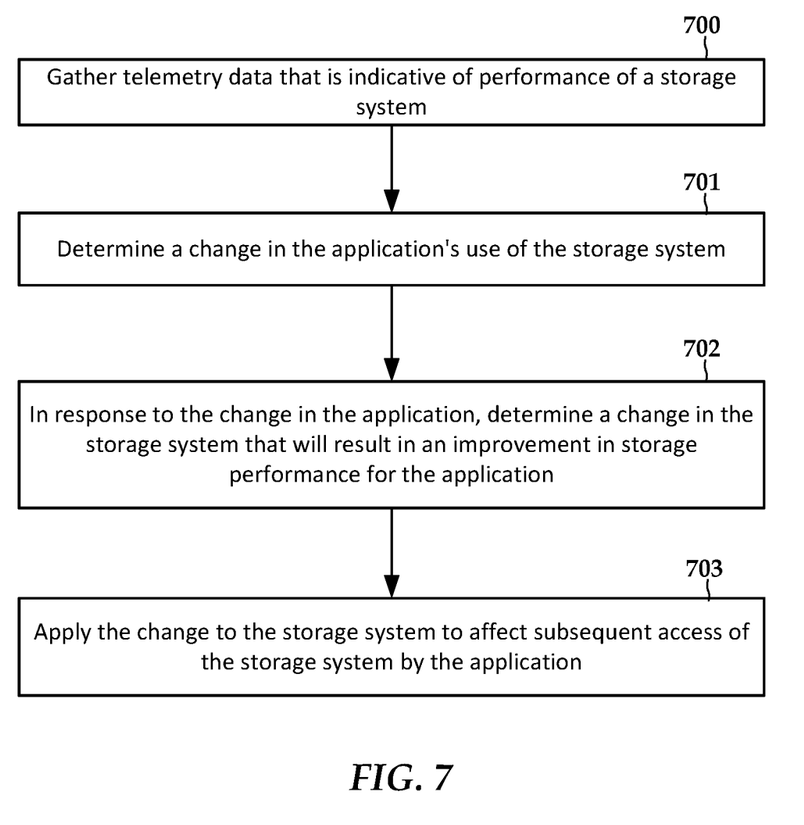
FIG. 7 is a flowchart of a method according to another example embodiment.

In FIG. 7, a flowchart shows a method according to an example embodiment. The method involves, during operation of a data center, gathering 700 telemetry data that is indicative of performance of a storage system. The data center includes a middleware client that abstracts and optimizes storage commands for an application operating in the data center. Via the middleware client, a change in the application's use of the storage system is determined 701, e.g., based on the telemetry or based on direct measurement via the middleware client. Responsive to the change in the application (and based on the telemetry), a change in the storage system is determined 702 that will result in an improvement in storage performance for the application. The change to the storage system is applied 703 via the middleware client to affect subsequent access of the storage system by the application.

In summary, a guided IO framework is described that adds a telemetry processor to process telemetry data. This enables the IO framework to gain rich information on application's workload and generate hints. This also enables the framework to make better optimization decisions based on detailed and up-to-date workload profiles and hints input from the telemetry processor.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such executable instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A method, comprising:
   during operation of a data center, gathering telemetry data that is indicative of performance of a storage system, the data center comprising a middleware client that optimizes and abstracts storage commands for an application operating in the data center;
   via the middleware client, determining a change in the application's workload while using the storage system;
   responsive to the change in the application's workload and based on the telemetry data, determining a change in the storage system that will result in matching storage performance to the workload of the application based on at least one of current throughput, random/sequential characteristics of data access, request sizes, and composition of reads versus writes; and
   applying the change to the storage system via the middleware client to affect subsequent access of the storage system by the application.

2. The method of claim 1, wherein the telemetry data is gathered in parallel by a plurality of nodes of the data center using a Map-Reduce framework.

3. The method of claim 1, wherein the middleware client facilitates reading and writing of a single file from multiple processes, and wherein the change in the storage system comprises a specification that indicates whether or not data sieving and two phase input-output will be performed for a read operation of the application.

4. The method of claim 1, wherein the change in the storage system comprises a change in distribution of data stored in parity chunks and data chunks of a de-clustered parity array.

5. The method of claim 1, wherein the change in the storage system comprises a change in a storage tier in which a data object is stored to balance performance versus cost based on data transfer speed, latency, and random/sequential data access characteristics associated with the data object and the storage tier.

6. The method of claim 5, wherein the telemetry data comprises an index showing how active the data object is during a specified period.

7. The method of claim 1, wherein the middleware client comprises a message passing interface input-output (MPI-IO) client that facilitates reading and writing of a single file from multiple processes.

8. The method of claim 1, wherein the change in the storage system comprises lowering a priority of integrity checking processes of the storage system to reduce latency for storage operations associated with user interactive processes.

9. The method of claim 1, wherein the change in the application's workload is determined based on the telemetry data.

10. A non-transitory computer-readable medium storing instructions, the instructions being executable by one or more processors to perform the method of claim 1.

11. A data center comprising:
    a plurality of computing nodes;
    a user application running on at least one of the computing nodes;
    a storage system that stores data for the plurality of computing nodes; and
    a middleware client running on a server of the data center that couples the user application to the storage system, the middleware client abstracting and optimizing storage commands for the user application and further operable to:
       during operation of the data center, gather telemetry data that is indicative of performance of the storage system;
       determine a change in the user application's workload while using the storage system;
       responsive to the change in the user application's workload, determine a change in the storage system that will result in matching storage performance to the workload of the user application based on at least one of current data throughput. random/sequential characteristics of data access. request sizes, and composition of reads versus writes; and
       apply the change to the storage system to affect subsequent access of the storage system by the user application.

12. The data center of claim 11, wherein the telemetry data is gathered in parallel by a plurality of nodes of the data center using a Map-Reduce framework.

13. The data center of claim 11, wherein the middleware client facilitates reading and writing of a single file from multiple processes, and wherein the change in the storage system comprises a specification that indicates whether or not data sieving and two phase input-output will be performed for a read operation of the user application.

14. The data center of claim 11, wherein the change in the storage system comprises a change in distribution of data stored in parity chunks and data chunks of a de-clustered parity array.

15. The data center of claim 11, wherein the change in the storage system comprises a change in a storage tier in which a data object is stored to balance performance versus cost based on data transfer speed, latency, and random/sequential data access associated with the data object and the storage tier.

16. The data center of claim 15, wherein the telemetry data comprises an index showing how active the data object is during a specified period.

17. The data center of claim 11, wherein the middleware client comprises a message passing interface input-output (MPI-IO) client, that facilitates reading and writing of a single file from multiple processes.

18. The data center of claim 11, wherein the change in the storage system comprises lowering a priority of integrity checking processes of the storage system to reduce latency for storage operations associated with user interactive processes of the user application.

19. The data center of claim 11, wherein the user application comprises a plurality of processes performing a clustered computing task that access common data structures of the storage system.

20. The data center of claim 11, wherein the middleware client is coupled to the storage system via a storage area network.

* * * * *

UNITED STATES PATENT AND TRADEMARK OFFICE
CERTIFICATE OF CORRECTION

PATENT NO. : 11,494,081 B2
APPLICATION NO. : 17/066566
DATED : November 8, 2022
INVENTOR(S) : Sining Wu It is certified that error appears in the above-identified patent and that said Letters Patent is hereby corrected as shown below:

In the Claims

In Claim 11 Line 25, the "." after the word 'throughput' should be deleted.

In Claim 11 Line 26, the "." after the word 'access' should be deleted.

In Claim 17 Line 57, the "," after the word 'client' should be deleted.

Signed and Sealed this
Eleventh Day of April, 2023

Katherine Kelly Vidal
*Director of the United States Patent and Trademark Office*